(12) United States Patent
Kinuta et al.

(10) Patent No.: US 7,771,788 B2
(45) Date of Patent: Aug. 10, 2010

(54) SPHERICAL ULTRAFINE PARTICLES AND PROCESS FOR PRODUCING THE SAME

(75) Inventors: Seichin Kinuta, Ashikaga (JP); Atsushi Nishino, Neyagawa (JP)

(73) Assignee: Optnics Precision Co., Ltd., Ashikaga-shi (JP)

(*) Notice: Subject to any disclaimer, the term of this patent is extended or adjusted under 35 U.S.C. 154(b) by 437 days.

(21) Appl. No.: 11/662,385

(22) PCT Filed: Sep. 7, 2005

(86) PCT No.: PCT/JP2005/016871

§ 371 (c)(1),
(2), (4) Date: Oct. 9, 2007

(87) PCT Pub. No.: WO2006/028257

PCT Pub. Date: Mar. 16, 2006

(65) Prior Publication Data

US 2008/0107902 A1    May 8, 2008

(30) Foreign Application Priority Data

Sep. 9, 2004    (JP) .............................. 2004-261756

(51) Int. Cl.
*B32B 5/66* (2006.01)
(52) U.S. Cl. .................. 427/212; 427/215; 427/222; 428/402; 428/403; 428/404; 428/405; 428/406; 428/407; 264/9; 264/12; 264/442
(58) Field of Classification Search ......... 428/402–407; 427/212, 215, 222; 264/9, 12, 442
See application file for complete search history.

(56) References Cited

U.S. PATENT DOCUMENTS 6,967,183 B2 * 11/2005 Hampden-Smith et al. .. 502/101

2002/0107140 A1    8/2002 Hampden-Smith et al.

FOREIGN PATENT DOCUMENTS

| EP | 1 358 124 A0 | 11/2003 | |
|----|----|----|----|
| JP | 2-43943 | 2/1990 | |
| JP | 5-253468 | 10/1993 | |
| JP | 6-279008 | 10/1994 | |
| JP | 7-39743 | 2/1995 | |
| JP | 9-215918 | 8/1997 | |
| JP | 11 1314 | 1/1999 | |
| JP | 2001-143973 | * 5/2001 | |
| JP | 2003-62449 | 3/2003 | |
| JP | 2003 203829 | 7/2003 | |
| JP | 2003-528419 | 9/2003 | |
| JP | 2004-51409 | * 2/2004 | |
| JP | 2004-505761 | 2/2004 | |
| WO | WO 00/15547 | 3/2000 | |
| WO | 02/13786 | 2/2002 | |

* cited by examiner

*Primary Examiner*—Leszek Kiliman
(74) *Attorney, Agent, or Firm*—Oblon, Spivak, McClelland, Maier & Neustadt, L.L.P.

(57) ABSTRACT

The method of the present invention can 1) produce spherical and scaly ultrafine particles without pulverization, 2) obtain spherical ultrafine particles having a sharp spherical particle diameter distribution without requiring a sieving step, 3) produce spherical ultrafine particles extremely approximating a true circle and possessing a particle diameter of 100 nm~50,000 nm allowing selection of a size suitable for the particular purpose of use and 4) produce spherical ultrafine particles on a commercial scale at low cost. There is also provided spherical ultrafine particles produced by the above production process. The spherical ultrafine particles of the present invention are characterized by a form having circularity of 0.9 to 1.0 and a particle diameter of 0.01 μm to 10 μm without pulverization. The spherical ultrafine particles can be produced by the method of the present invention using as a nozzle a base having special through holes and hole density. In this base nozzle, the through holes have a diameter of 0.05 μm~50 μm, a through hole aspect ratio of 5 to 200 and a hole density of 100 to 7,000/cm².

15 Claims, 2 Drawing Sheets

SPHERICAL ULTRAFINE PARTICLES AND PROCESS FOR PRODUCING THE SAME

TECHNICAL FIELD

This invention relates to the configuration of ultrafine particles, such as of spherical simple metal for use in cells including a nickel hydrogen cell (Ni-mH), electron components including a ceramic condenser and an electrical double layer capacitor, medical preparations and catalysts, of spherical activated carbon, of spherical porous silica and of printer-oriented spherical carbon toner, which can be manufactured from raw materials for spherical ultrafine particles without requiring pulverization, and to a method for the production of the ultrafine particles. This invention relates, as a developed application, to a method of production that enables even provision of ultrafine particles in a thin or flaky shape without requiring pulverization.

BACKGROUND ART

The conventional techniques have necessitated methods of production to be varied with melting points of raw materials fated to form spherical particles. The metallic spherical powder, such as of solder, and the spherical particles, such as of porous silica gel, are produced by the spray method using a heat-resisting spray nozzle and controlling the atmosphere at a temperature in the range of 280° C.~330° C. in the case of solder or at a temperature in the range of 700° C.~900° C. in the case of alkali-rich low-softening glass of silica gel.

The spherical particles of phenol resin that are commercially available include the product of Kanebo Ltd. sold under the trademark designation of "Bellpearl S" and the product of Gun Ei Chemical Industry Co., Ltd. sold under the trademark designation of Marilyn HF-050W," for example. They are produced by a method that adopts a high-speed rotation for emulsion-polymerizing a resole resin and an aldehyde, such as formalin, to induce polymerization of ultrafine particles. JP-A 2003-203829, however, discloses a method wherein the particles have such a large particle diameter as falls in the range of 30 μm~500 μm and, therefore, are pulverized again to such a particle diameter of practical use as falls in the range of 3~8 μm prior to use as a material for electronic components. JP-A HEI 11-1314 proposes a method that comprises mixing a phenol resin with a cellulose derivative and a solvent, subjecting them to mutual phase separation, causing the phenol resin to harden, and thereafter removing the solvent and the cellulose. This method is complicated in process and is not disclosed so much as to a step of effecting fine division of resin and clarified as to the question on why the formation of ultrafine particles is feasible. A method that produces ultrafine particles having such a particle diameter as not exceeding 9 μm without requiring pulverization has been neither proposed nor achieved to practice to date. Such is the true state of affairs.

According to the conventional method that finely divides such a substance bearing a melting point as simple metal, alloy, glass or an organic compound with a spray nozzle at a temperature exceeding the melting point thereof, depending on the solid state properties, the particles successfully mass-produced thereby mostly have particle diameters generally measuring several mm. The particle diameters of 100 μm~500 μm are still on the laboratory level today. A method that mass-produces particles having a diameter of not more than 10 μm without requiring pulverization, therefore, remains yet to be developed. The hot spray nozzle method suffers the nozzle to wear and corrode severely, produces particles of a large diameter and a wide particle diameter distribution, and incurs extreme difficulty in producing particles having a particle diameter distribution within a specified range even in spite of using a sieve machine. Particularly for spherical granules measuring approximately 100~1,000 nm in diameter, industrial pulverizers and sieve machines remain yet to be developed.

Of the conventional methods described above, the method that obtains ultrafine particles by subjecting a system additionally using a second and a third substance to high-speed rotation during the course of emulsion polymerization involves a complicated process, renders removal of an impurity difficult, and incurs difficulty in accomplishing fine division without undergoing a step of pulverization.

This invention, therefore, is aimed at overcoming the problems heretofore encountered as described above and accomplishing the following improvements in properties: 1) ability to produce spherical and scaly ultrafine particles without requiring pulverization, 2) ability to obtain spherical ultrafine particles possessing a sharp spherical particle diameter distribution without requiring a sieving step, 3) ability to obtain spherical ultrafine particles extremely approximating true circle and possessing a particle diameter of 100 nm~50,000 nm allowing selection of a size suitable for the particular purpose of use, and 4) ability to permit commercial production at a low cost.

DISCLOSURE OF THE INVENTION

The means of this invention to solve the problems is characterized by using a base furnished with special through holes and possessing a special through hole density as a nozzle. In this base nozzle, a base wherein the through holes have a hole diameter in the range of 0.05 μm~50 μm, an aspect ratio (the ratio of the hole diameter and the length of through holes) in the range of 5-200 and a hole density in the range of 100~7,000 pieces/cm$^2$ is used as the nozzle.

This invention concerns a method for obtaining spherical ultrafine particles by subjecting a base nozzle possessing a multiplicity of through holes to periodic micro-vibration generated by driving a piezoelectric component or a motor, causing a liquid slurry substance formed of a powdery material to be quantitatively and periodically cut in a nozzle opening part furnished with a multiplicity of through holes, thereby giving rise to spherical liquid drops and thereafter passing the liquid drops through the steps of drying, reduction, oxidation, heat treatment, carbonization and active carbonization without requiring pulverization. Incidentally, the fact that the process of this invention when necessary, is so configured that voltage is applied between the nozzle of this invention and the ground by using an external power source and the atomized particles spouted through the nozzle are electrically charged lest the particles should be mutually recombined constitutes one of the characteristic features of this invention.

The term "circularity" as used in this invention is defined as the value resulting from dividing the circumferential length of a circle equaling the projected cross section of a particle on the image of an electron microscope by the projected profile length of the particle. For the purpose of ensuring accuracy of this true circle, the circularity is expressed by the average of the results of measurement of 100~150 particles.

That is, the spherical ultrafine particles of this invention are characterized by possessing such a form that the circularity falls in the range of 0.9~1.0 and that the particle diameter falls in the range of 0.01 μm~10 μm without requiring pulverization.

The method for producing the spherical ultrafine particles of this invention is characterized by causing the liquid powdery raw material to pass through the base nozzle possessing a multiplicity of through holes measuring not more than 5 μm in diameter, thereby obtaining liquid spherical particles and converting these particles into finished spherical ultrafine particles of a form having circularity of 0.9~1.0 and particle diameter of 0.01 μm~10 μm.

Further, the method for producing the spherical ultrafine particles of this invention is characterized by using in the method of production mentioned above a base nozzle furnished with a multiplicity of through holes, namely the base used as a nozzle such that the through holes have a hole diameter in the range of 0.05 μm~50 μm, an aspect ratio in the range of 5-200 and a hole density in the range of 100-17,000 pieces/cm$^2$.

Furthermore, the method for producing the spherical ultrafine particles of this invention is characterized by using in the method of production mentioned above a base furnished with a multiplicity of through holes and having the base formed of such as a platinum family element, a platinum family-based alloy and a carbon material and such a valve action metal or alloy as nickel, a nickel-based alloy, titanium or tantalum.

Then, the method for producing the spherical ultrafine particles of this invention is characterized by using in the method of production mentioned above a base furnished with a multiplicity of through holes and causing the base to be vibrated at a fixed speed by the power of an ultrasonic vibrator or a piezoelectric component and consequently enabling a liquid substance in motion under pressure to be sectioned into uniform liquid particles and eventually made to form liquid spherical particles.

Further, the method for producing the spherical ultrafine particles of this invention is characterized by causing the spherical ultrafine particles in the method of production mentioned above to be formed by preparing a slurry liquid substance formed of an organic substance, an inorganic substance and a ceramic substance, passing the liquid substance through the through holes and thereafter causing the liquid substance to be processed into prescribed particles.

Furthermore, the method for producing the spherical ultrafine particles of this invention is characterized by using in the method of production mentioned above spherical ultrafine particles formed of the aforementioned inorganic substance and organic substance as an intermediate substance and passing the intermediate substance through such consecutive steps as carbonization, activation, oxidation, reduction and dealkalization, thereby forming spherical ultrafine particles of carbon, activated carbon, silica, nickel and such simple metal as a platinum family.

Then, the method for producing the spherical ultrafine particles of this invention is characterized by using in the method of production mentioned above the organic substance such a thermosetting resin as, for example, phenol resin, furfural resin, melamine resin, urea resin, epoxy resin, alkyd resin, unsaturated polyester resin, silicone resin, xylene resin or urethane resin.

Further, the method for producing the spherical ultrafine particles of this invention is characterized by using in the method of production mentioned above the inorganic substance that is water glass, clay or ceramic slurry.

Furthermore, the method for producing the spherical ultrafine particles of this invention is characterized by using in the method of production mentioned above the ceramic slurry that contains at least one kind of substance selected from the group consisting of alumina, silica, cordierite, mullite, zirconia, chamotte, barium titanate and zeolite.

Then, the method for producing the spherical ultrafine particles of this invention is characterized by using in the method of production mentioned above the ceramic slurry that exhibits at the outlet of the atomizer such viscosity as falls in the range of 150~3,000 cp.

Further, the method for producing the spherical ultrafine particles of this invention is characterized by using in the method of production mentioned above a process that comprises applying electric power between the nozzle finished with through holes and the ground by using an external power source, charging the atomized particles spouted through the nozzle and consequently preventing the atomized particles from being mutually recombined.

Furthermore, the method for producing the spherical ultrafine particles of this invention is characterized by using in the method of production mentioned above a process that comprises causing the electrically charged liquid ultrafine particles to fall, adding a surfactant to a solution fated to react with the reaction solution and deforming the spherical particles into any of such particulate shapes as scaly shape, oval shape and spherical shape.

Then, the method for producing the spherical ultrafine particles of this invention is characterized by causing the nozzle part furnished with through holes to be used in the method of production mentioned above in an inert, reducing or oxidizing atmosphere, depending on the purpose of use and allowing this atmosphere to be directly controlled subsequent to the fine division into the liquid ultrafine particles.

This invention, as described in the text of this specification, is directed to providing a method that is capable of commercially producing ultrafine particles measuring not more than 50 μm in diameter with high efficiency without requiring pulverization and as well providing a method of commercial production that can flexibly cope with the case of requiring particles of low circularity or the industrial utility requiring a scaly shape, depending on the purpose of use. Further, the method of production contemplated by this invention permits commercial production at low cost and abounds immensely in commercial value in respect that it can provide the material production technology most suitable for the nano-age of the coming generation.

BEST MODE FOR CARRYING OUT THE INVENTION

Figure 1:
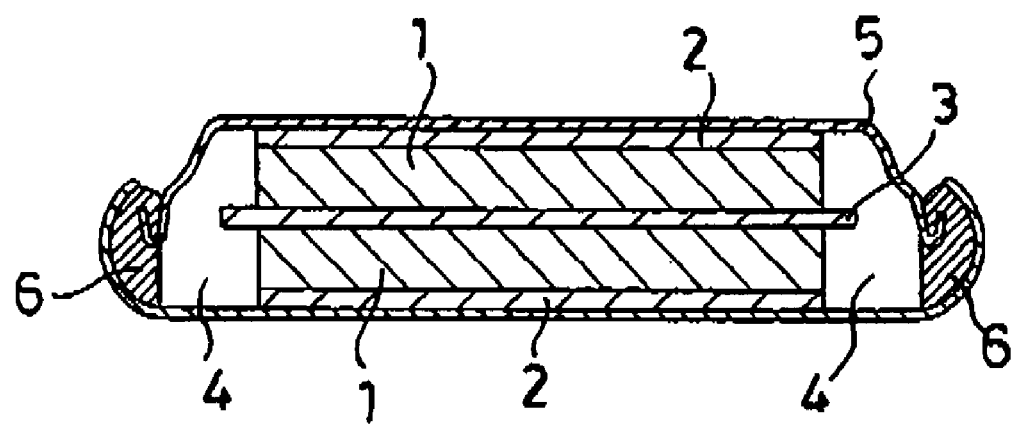
FIG. 1 is a cross section of the construction of an example of the conventional electrical double layer capacitor and FIG. 2 is a diagram of the process for the production of spherical toner particles according to this invention.

The nozzle that is finished with a multiplicity of through holes and used for this invention is basically produced by the electroforming method. The through holes prefer to have a hole diameter in the range of 0.05 μm~50 μm. If the diameter falls short of 0.05 μm, the shortage will result in impairing the mass-producing property. If the diameter exceeds 5 μm, the excess will result in necessitating strength. The aspect ratio prefers to be in the range of 5-200.

If the aspect ratio falls short of 5, the shortage will result in degrading circularity. If the aspect ratio exceeds 200, the excess will result in rendering fabrication of the nozzle difficult and expensive. In consideration of the commercial mass production, the aspect ratio prefers to be in the range of 5~200. Then, the hole density of the nozzle prefers to be in the range of 100~7,000 pieces/cm$^2$ in consideration of the effect of mass production.

The base of the nozzle prefers to be formed of such as a platinum family element, a platinum family-based alloy, a carbon material and SiC and such a valve action metal or alloy as nickel, a nickel-based alloy, titanium or tantalum. In consideration of the mass-producing property and the cost, such valve action metals and alloys as nickel, a nickel-based alloy, titanium and tantalum, and a platinum family element, a platinum family-based alloy and carbonaceous materials prove to be economical.

The materials to which this invention can be applied are such raw materials of this invention as organic substances, inorganic substances, ceramic substances and slurry liquid products thereof. These materials are passed through the nozzle furnished with a multiplicity of through holes and are subsequently processed into prescribed particles without requiring pulverization.

In this invention, the ultrafine particles are formed by transferring these slurry liquid substances under pressure at a fixed speed and sectioning the slurry liquid substances at intervals of a fixed length by driving an ultrasonic vibrator comprising such as barium titanate and PZT.

Since the quantitatively sectioned spherical particles discharged from the nozzle are electrically charged in consequence of the application of a voltage in the range of 400~1,200 V to the nozzle by an external power source, they are advanced without being mutually recombined to the subsequent steps of drying, firing, reduction, carbonization and activation.

The thermosetting resins usable for this invention are phenol resin, furfural resin, melamine resin, urea resin, epoxy resin, alkyd resin, unsaturated polyester resins, silicone resin, xylene resin and urethane resin, for example. These resins are used either singly or in the form of a combination of two or more members. Where the carbon in the form of ultrafine particles is needed, such resins as phenol resin and furfural resin that have high yields of carbonization are selected. Where carbon-based ultrafine particles having low resistance are needed, petroleum tar and coal tar are used as raw materials.

While the liquid slurry prefers to have viscosity in the range of 150~3,000 cp, the viscosity in the range of 150~400 cp proves to be suitable in consideration of the mass-producing property.

The main object of this invention resides in spherical ultrafine particles. This invention, however, enables the spherical ultrafine particles to be changed optionally to any of such shapes as spherical shape, oval shape and scaly shape by adjusting the concentration in which the surfactant is added to the liquid layer intended to be reacted by the atomized spherical particles. The surfactants usable herein include nonionic surfactants, bipolar ion surfactants and fluorine-based surfactants, for example.

EXAMPLES

Now, the embodiment of this invention will be described in detail below with reference to electrochemical activated carbon, porous silica and printer-oriented carbon toner. This invention is not limited to these examples.

Example 1

Method for Production of Electrochemical Activated Carbon

The electrochemical activated carbon is being used in large quantities for air wet cells and electrical double layer capacitors. First, the activated carbon for use in the electrical double layer capacitors that have been highlighted recently will be described in detail below.

The electrical double layer capacitors now on sale are known in two types, i.e. the coin type that is produced as illustrated in FIG. 1 and disclosed in JP-B HEI 2-13453, a prior application by the present inventors, by causing an element resulting from nipping a separator 3 between a pair of polarized electrodes 1 comprising a powdered activated carbon possessing a high specific surface area as a main component on a current collector 2 formed of etching aluminum foil to be sealed together with an electrolytic solution 4 in a metallic case with the cap of the metallic case, a metallic rid 5 thereof and a gasket 6 insulating them from each other and the crimp type that is produced by causing a crimp element resulting from crimping a pair of sheetlike polarized electrodes via an intervening separator to be contained together with an electrolytic solution in a metallic case of aluminum and sealing the opening part of the case lest the electrolytic solution should vaporize therethrough.

As the electrolytic solution for the conventional electrical double layer capacitor, such a solvent of high dielectric constant as water or propylene carbonate (PC) has been used for the purpose of enabling the electrolyte to be dissolved in a high concentration. Then, for the polarizing electrode, a powdered activated carbon or activated carbon fibers having a high specific surface area have been in use.

Of the properties that the electrical double layer capacitors are required to possess, a) high electrostatic capacity, b) high energy density, (c) low capacity reduction factor in the charge-discharge cycle and d) low internal resistance generally prove to be particularly important.

Particularly, in recent years, the electrical double layer capacitors have been approaching the time of adoption for brake assists and engine assists in automobiles. Thus, the desirability of endowing the electrical double layer capacitors with veritably high performance has been finding growing recognition and the desirability of enhancing activated carbon in performance and density has been gaining in prominence.

As one measure of solution, rigid control of the particle diameter distribution of activated carbon has been inciting growing demand. The particle size distribution was in the range of 10 μm~15 μm in 1999 and in the range of 5 μm~8 μm in 2002 and is estimated to be in the range of 3 μm~8 μm to satisfy the demand in the near future. Thus, the particle size of activated carbon has advanced to the level of atomization in consequence of the addition to performance and the demand for decreasing the width of particle size distribution has been gaining in prominence.

Pulverization and classification are common measures available for the decrease of the width. Since the carbon of the activated carbon possesses solid-state properties sufficient for abrasive material and incurs extreme difficulty in being pulverized to a size of not more than 5 μm. The classification reveals extreme deficiency in economy and the extreme atomization entails adulteration of activated carbon with an impurity originating in the wear of the pulverizer. The extreme atomization of activated carbon with the pulverizer has 5 μm as its limit attainable on the commercial scale. As a measure to overcome this limit, this invention proposes a method that is capable of producing ultrafine particles of activated carbon without requiring pulverization as described in detail in the following example.

of 35%~45%, though depending on the particle diameter of particles. In consideration of the raw material for carbonization and the yield of activated carbonization, the particle diameter of the raw material for the resin is set to a slightly larger size. The activation of the activated carbon was implemented by the steam activation method.

TABLE 1

|  |  | Solid-state properties ||||  | Electrode/capacitor properties |||| Results of charge and discharge test ||
|---|---|---|---|---|---|---|---|---|---|---|---|
|  |  | Presence of pulverlization | Average particle diameter (μm) | Pore volume (cm$^2$/g) | Specific surface area (cm$^2$/g) | Circularity | Bulk density of activated carbon (g/cm$^3$) | Electrode density (g/cm$^3$) | Electrostatic capacity (F/cm$^3$) | Internal resistance (Ω) | Rate of change of electrostatic capacity (%) | Rate of change of internal resistance (%) |
| Ex. | 1 | No | 10 | 1.2 | 1700 | 0.98 | 0.65 | 0.81 | 21.2 | 59 | −8 | +9 |
|  | 2 | No | 8 | 1.3 | 1900 | 0.8 | 0.68 | 0.78 | 22.1 | 58 | −8 | +8 |
|  | 3 | No | 5 | 1.35 | 2100 | 0.97 | 0.71 | 0.72 | 23.2 | 52 | −6 | +6 |
|  | 4 | No | 3 | 1.4 | 2200 | 0.96 | 0.68 | 0.68 | 26.3 | 48 | −5 | +6 |
| Conv. Ex. | 11 | Yes | 30 | 0.88 | 1600 | 0.98 | 0.55 | 0.72 | 17.5 | 60 | −22 | +18 |
|  | 12 | Yes | 17 | 0.91 | 1800 | 0.75 | 0.58 | 0.63 | 19.2 | 65 | −20 | +15 |
|  | 13 | Yes | 8 | 1.22 | 2100 | 0.55 | 0.42 | 0.52 | 20.5 | 85 | −15 | +11 |

This invention is capable of producing spherical ultrafine particles having an average particle diameter in the range of 0.05 μm~10 μm and circularity in the range of 0.9~1.0 without requiring pulverization. The existing state of industry barely allows achieving a particle size distribution in the range of 5 μm~10 μm while the industry is strongly demanding activated carbon having a particle size distribution of 3 μm~5 μm. The existing method that resorts to pulverization reveals inefficiency and suffers adulteration of the produced particles with an impurity originating in extreme atomization. No other method, however, has reached the level of allowing commercial production. Though the study of the above method of production is now under way, it is held that it incurs difficulty in befitting mass production.

Now, the characteristic features of the method of production contemplated by this invention will be described in detail below by reference to Table 1 that compares the method for the production of activated carbon according to this invention and the conventional method of production in terms of an electrical double layer capacitor.

First, the conventional method produces activated carbon by the aforementioned, publicly known technique, namely a process involving use of phenol, formalin and a stabilizer and requiring high-speed agitation. It produces spherical particles that measure 20 μm~30 μm in diameter and, therefore, requires them to be subsequently pulverized to a desired particle diameter and classified. Conventional Examples 11, 12 and 13 shown in Table 1 represent the products that were obtained by this method and are available in the market. In contract, Examples 1, 2, 3 and 4 shown in the same table represent spherical activated carbon products measuring 3~10 μm in diameter, which were obtained by imparting viscosity of 300~1,200 cp to the raw material solution of phenol resin composed of phenol, formalin and a stabilizer by the use of a base nozzle furnished with through holes 5 μm in diameter at a hole density of 6,000 pieces/cm$^2$ and atomizing the resultant liquid particles by the use of an ultrasonic vibrator. Incidentally, the phenol resin contemplated by this invention has a yield of carbonization in the range of about 50%~65% and a yield of activated carbonization in the range The solid-state properties, the capacitor property and the charge-discharge property of the activated carbon used in Example 1 are collectively shown in Table 1. Incidentally, the configuration of the electrode was implemented by a method that comprised fabricating a polarized electrode by coating an aluminum current collector having an etching ratio of 20 times and a film thickness of 20 μm so much with a composition containing 5 weight % of publicly known PTFE binder, 2 weight % of acetylene black and 1.5 weight % of CMC as a coating auxiliary as to give a film thickness of 150 μm after drying, containing the polarized electrode having an outside diameter of 16 mm in a case measuring 20 mm in inside diameter and resembling a coin, and using as an electrolytic solution propylene carbonate (PC) containing tetraethylammonium tetrafluoroborate ($(C_2H_5)_4NBF_4$) as an electrolyte in a concentration of 1 mol/l.

The electrode characteristic of the activated carbon that was reduced to the magnitude in unit volume is shown in the table. The charge and discharge test as a test for accelerated service life was performed to determine the rate of change of electrostatic capacity at 70° C. for 200 hours. The results were indicated as the ratios of a decrease from the initial capacity to the initial capacity. The ratios of change in internal resistance shown in the table were the results obtained by 300 hours' standing at 70° C. and they represent the ratios of change from the initial value to the initial value.

Capacitor Properties

As regards the capacitor properties shown in Table 1, the spherical particles obtained by this invention has the structure of the closest packing, so exhibits a large bulk density as compared with those obtained by the conventional method and demonstrates excellent packing property. Further, the bulk density of activated carbon and the density of the electrode show the excellence in the packing property by 10%~20%. As a result, excellent properties were manifested as evinced by the improvement in the electrostatic capacity by 10%~20% and the relatively small internal resistance.

From the results of the test for accelerated service life, it is found that the ratio of change in electrostatic capacity (−ΔC)

was in the range of ½~⅓, an extremely small magnitude as compared with that obtained by the conventional method and the ratio of change in internal resistance was relatively small as well. These favorable results may be probably explained by a supposition that since the method of production of this invention involves no mechanical pulverization, the adulteration of the produced particles with a heavy metal impurity originating in mechanical abrasion in the pulverizer and the classifying device did not occur appreciably, the generation of gas during the charge and discharge test at such a high temperature as 70° C. was slight, and the collapse of the electrode was inconspicuous.

Example 2

Printer-Oriented Toner

The conventional printer-oriented toner has been produced in the basic configuration having comminuted carbon particles about 1 μm~10 μm in diameter adhere to the surface of the comminuted iron particles measuring about 100 μm in diameter and serving as a carrier via an adhesive agent. This method is at a disadvantage in revealing deficiency in the yield of production of the spherical particles of iron powder, suffering the produced comminuted carbon particles to occupy a large particle size distribution of 1~10 μm, failing to impart a spherical shape to the produced particles, incurring difficulty in uniformly coating the surface of iron power with the dyestuff, betraying inferiority of yield of production and consequently suffering the toner to become expensive.

In recent years with regard to printers, the demand for enhancing definition, adding to speed, saving energy and reducing the waiting time has been gaining in strictness and the technological innovations directed along this trend have been advancing. As regards the method for toner production, however, the conventional method has been merely adapted for atomization and has not attained any technological novelty. Such is the true state of affairs.

The method of production according to this invention is aimed at enabling frictional electrification to proceed quickly and efficiently, enhancing printing effect, adding to printing accuracy, improving the printing speed in consequence of atomization, saving energy and reducing the waiting time by decreasing the diameter of the spherical particles as the carrier prevailing today from the level of 100μ to 30μ-40μ, imparting a decreased diameter of 0.5 μm~1 μm to the spherical carbon particles as a toner for the purpose of enabling the particles to approximate circularity, atomizing the spherical carbon particles as a toner to a diameter in the range of 0.5 μm~1.0 μm with a view to attaining circularity and adjusting the circularity to 80~90 for the purpose of facilitating frictional electrification.

Process Diagram for Toner Production

Figure 2:
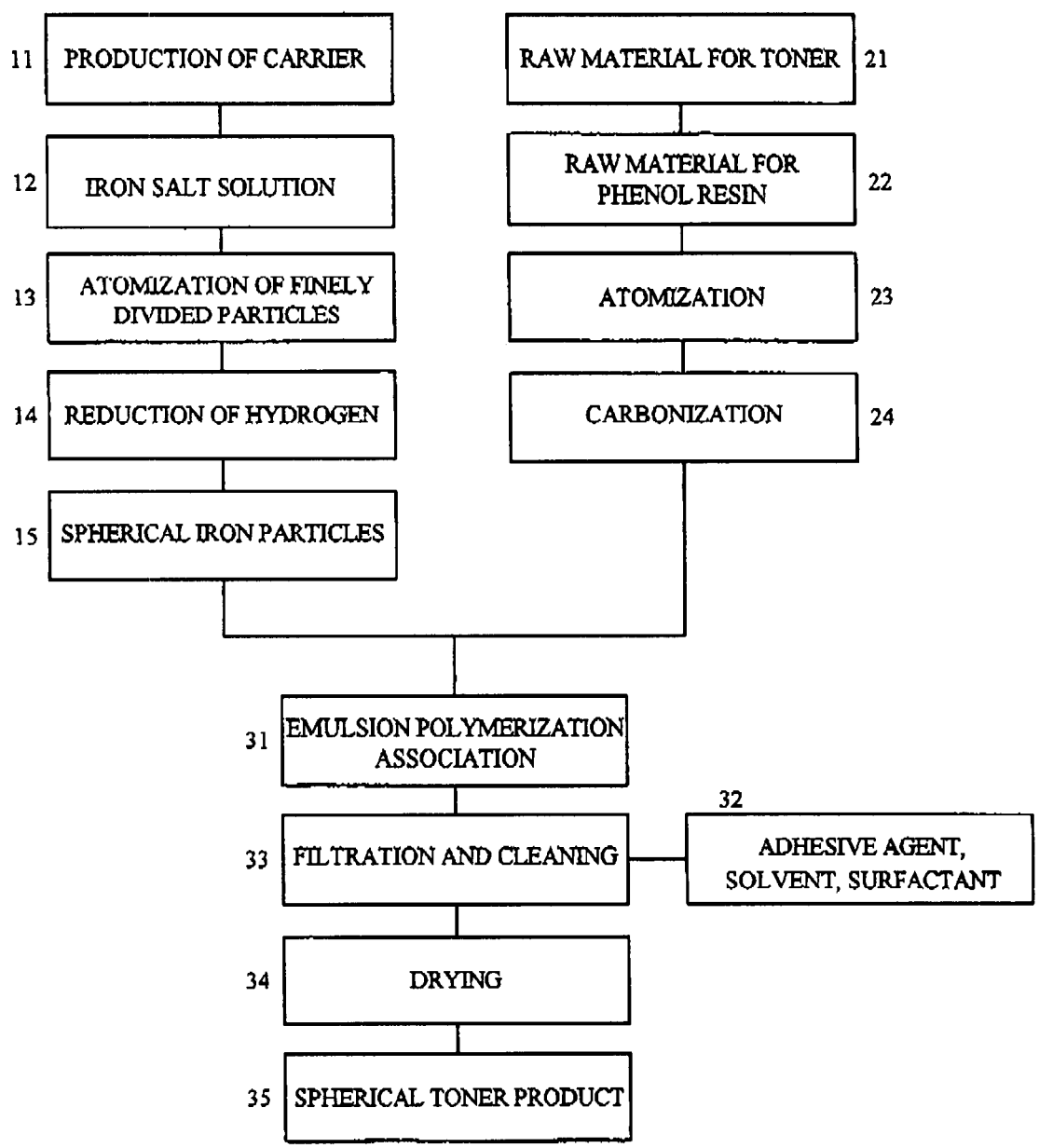

FIG. 2 is a process diagram depicting the production of spherical toner of this invention. In the production of the spherical ultrafine particles of iron powder as a carrier, spherical iron particles 15 measuring 30 μm~40 μm in diameter and having circularity of 90% are obtained by atomizing an iron chloride solution having a viscosity of 400 cp in a reducing atmosphere composed of 20% of $N_2$ gas and 80% of $H_2$ gas at a temperature of 350° C. by using a nozzle 13 similar to the nozzle used in Example 1 of this invention.

On the other hand, as regards the production of carbon toner, a spherical ultrafine powder 24 is obtained as a carbon toner by subjecting a phenol resin raw material 22 plus a surfactant and a stabilizer to atomization with the nozzle of this invention similar to the nozzle used in Example 1 into spherical ultrafine particles 23 having circularity of 80~90% and enabling easy frictional electrification and subsequently carbonizing the particles 23 in a nitrogen atmosphere.

A spherical toner 35 according to this invention is obtained by causing spherical iron ultrafine particles 15 and the spherical ultrafine powder 24 of carbon toner to be stirred and mixed in conjunction with an adhesive agent, a solvent and s surfactant 32 by the emulsion aggregation method 31, thereby effecting emulsion aggregation, subjecting the resultant product of aggregation to a filtering and cleaning process 33 subsequent to completion of the reaction and giving a drying process 34 to the resultant matter.

Example 3

Method for Producing Spherical Porous Silica

The conventional technique implements this production by subjecting alkali-excess molten glass to the spray method at an elevated temperature in the range of 700° C.~900° C. as described above. This conventional method has entailed various problems, such as entailing corrosion of the nozzle due to the high temperature and the presence of strong alkali, lacking uniformity of particle size distribution, requiring high cost of production and revealing unduly low yield of fine particles not more than 100 μm in diameter.

In recent years, the demand for ultrafine particulate porous silica having a particle diameter in the range of 0.1 μm~10 μm has been prevailing. The demand for filters used for separation of coagulated protein during the production of beer, undercoats used for protecting automobiles and household appliances from corrosion and carriers used for medicines and catalysts has been mounting, and the demand has been directed to spherical fine particles as well.

To answer the demand, the spherical porous silica aimed at can be obtained by atomizing a water glass solution 400~800 cp in viscosity at a temperature of 25° C. with the same nozzle 13 as used in Example 1 of this invention described above, causing the resultant atomized glass particles to fall on a sulfuric acid solution and enabling them to react with sulfuric acid. The particle diameter becomes the function that combines the hole diameter of the nozzle, the viscosity of the water glass, the density thereof during the passage through the nozzle and the kind and concentration of the surfactant. Then, the porosity of the fine particles, the shape of particle and the circularity become the functions that combine the concentration of sulfuric acid and the kind and concentration of the surfactant.

The electrical charging of the nozzle during the production of the spherical porous silica is effective in preventing the fine particles from being mutually recombined and also preventing the ultrafine particles from coagulation.

Example 4

Method for Producing Spherical Fine Particles of Metal

The finely divided particles of a platinum family metal that are used for electronic material and materials for catalysts generally occur in a spherical shape and a scaly shape. Particularly when these spherical and scaly particles are compounded in a proper ratio for use in electroconductive coating materials, they result in improving specific resistance, adhesion property, durability and frequency characteristic.

a) Spherical finely divided particles of silver b) Scaly finely divided particles of silver Further, this invention is directed to a method that is not only adaptable to platinum family metals but also applicable to such base metals as aluminum and nickel.

When the complex salt solution of metal ions is atomized into finely divided particles of a fixed diameter with a nebulizer and the resultant solution of finely divided complex salt is brought into contact with or introduced into a reducing solution or a reducing gas capable of reacting with the metal, the complex salt solution of finely divided particles of metal is instantaneously reduced to a metal and precipitated in the form of powdered metal to the bottom of the reducing agent solution or the precipitation is optionally promoted by using a centrifugal separator capable of about 10,000 rounds per minute for the sake of recovery of finely ground powder. In the case of the introduction into the reducing gas, the precipitate is immediately deposited in the form of finely divided powder on the bottom. It has been ascertained that since the size of the finely ground powder depends on the size of the finely divided particles emanating from the nebulizer and the concentration of the metal complex salt solution, the size of the finely ground powder of metal can be decided by deciding the concentration of the metal complex salt solution and controlling the diameter of the nozzle mesh annexed to the nebulizer and adapted to control the diameter of liquid drops discharged from the nebulizer.

As regards the form of the powder, it has been confirmed that the particles of the reduced metal powder assume a circular shape or a flat flaky shape, depending on the question whether the reducing agent is in a liquid form or a gaseous form or on the form that the finely divided particles of metal complex salt assume at the instant of their contact with the reducing solution. The foregoing example has explained a method for manufacturing a finely comminuted metal powder having a uniform particle diameter by reference to the reaction of reduction, one kind of chemical reaction, performed on the metal ion solution spray atomized with the nebulizer. While the chemical reaction is known, in numerous types including the acid-alkali reaction and the oxidizing reaction, for example, any chemical reaction is enabled by utilizing the nebulizer for spray atomization to be adapted for the production of the powder having a uniform particle diameter. The finely comminuted powder having a uniform particle diameter could be prepared by utilizing a physical phenomenon wherein the solvent, i.e. an organic solvent or an aqueous solution, was vaporized naturally without entraining a chemical reaction. For example, a sugar powder having a uniform particle diameter of 3 μm could be manufactured by spraying a 20% sugar solution into a scaled box containing silica gel by the use of a nebulizer furnished with a mesh nozzle having a hole diameter of 15μ.

When a liquid monomer resin capable of reacting with ultraviolet light is spray-atomized and introduced by the nebulizer into an environment irradiated with the ultraviolet light, extremely atomized particles amply absorb the energy of the ultraviolet light and become spherical solid polymer resin having a uniform diameter. For example, the resin solution obtained by spray-atomizing a solution resulting from adding a 2.5% reaction initiator solution to a resin solution prone to be hardened with ultraviolet light by the use of a nebulizer furnished with a nozzle mesh having a hole diameter of 2.5 μm went well with in instantaneously producing a circularly spherical finely comminuted powder having a uniform diameter of 3 μm in an environment irradiated with an ultrahigh pressure mercury lamp 1.5 kilowatts in power.

The term "nebulizer" as used herein refers to a device that is endowed with the function of enabling liquid particles of a uniform particle diameter to fly out by intermittently spouting a solution with a piezoelectric component of PZT at a cycle ranging from several hertzs to several hundred kilohertzs and further atomizing the spouted solution through a mesh nozzle containing several thousand holes having a controlled diameter as well.

To cite another concrete example, when the addition of aqueous ammonia to a 15% silver nitrate solution is continued without regarding the occurrence of the precipitate of hydroxide of silver, the hydroxide is dissolved till a clear liquid is formed. When this clear liquid was treated as a silver complex salt solution and a 20% glyoxal solution as a reducing agent solution were placed in a total volume of about 250 ml in a 500-ml beaker and the silver complex salt solution was sprinkled in the form of finely divided particles having a diameter of 25 μm with a nebulizer on the surface of the resultant solution, silver powder having a uniform particle diameter of about 2 μm occurred on the surface of the reducing agent solution and then sedimented on the bottom of the reducing agent solution. The sediment could be recovered in the form of a powder having a uniform particle diameter.

When a 50 wt % zinc chloride solution was sprayed into solution particles 25 μm in diameter with the nebulizer and the solution particles were forwarded, with oxygen as a carrier gas, into a quartz tube measuring 50 mm in diameter, enveloped with an infrared lamp and held at 100° C., zinc oxide powder having a uniform particle diameter was deposited at the carrier gas outlet and could be recovered. The particles of this powder were veritably circular and had a diameter of 6 μm.

When a 20 wt % calcium hydroxide solution was spouted as atomized into carbon dioxide gas with a nebulizer having a hole diameter of 18 μm, calcium carbonate powder having a uniform particle diameter of 3 μm was produced. The resultant sediment could be recovered by using a centrifugal separator.

INDUSTRIAL APPLICABILITY

This invention, as described above, is aimed at providing a method that enables ultrafine particles not more than 50 μm in diameter to be commercially produced highly efficiently without requiring pulverization and, depending on the purpose of use, providing a method of commercial production that can flexibly cope with the demand for which particles of low circularity suffice or the industrial application which needs particles of a scaly shape. Further, the method of production contemplated by this invention is capable of implementing commercial production at low cost and is capable as well of providing a material production technology most suitable for the nano-age in the coming generation and, therefore, abounds veritably in commercial value.

The invention claimed is:

1. A method for the production of spherical ultrafine particles, comprising:

vibrating a base nozzle possessing a multiplicity of through holes at a constant rate with power of an ultrasonic vibrator or a piezoelectric component, conveying a slurry liquid substance to said base nozzle, causing said liquid substance to pass through said through holes, and thereby dividing said liquid substance uniformly to give rise to liquid spherical ultrafine particles, drying said liquid spherical ultrafine particles or subsequently drying and firing said liquid spherical ultrafine particles, and producing said spherical ultrafine particles in a form having circularity in a range of 0.9 to 1.0 and a particle diameter in a range of 0.01 to 10 µm, wherein in said base nozzle, said through holes formed in a base of said base nozzle have a hole diameter in a range of 0.05 µm to 50 µm, an aspect ratio of the through holes in a range of 5 to 200 and a hole density of the through holes in a range of 100 to 17,000 pieces/cm$^2$.

2. A method for the production of spherical ultrafine particles according to claim 1, wherein said spherical ultrafine particles are obtained by causing a slurry liquid substance comprising at least one of an organic substance, an inorganic substance and a ceramic substance to pass through said through holes and thereafter processing an emanating substance into prescribed particles.

3. A method for the production of spherical ultrafine particles according to claim 2, wherein spherical ultrafine particles formed of said inorganic substance and organic substance are used as an intermediate medium, the intermediate medium is passed through continual steps comprising carbonization, activation, oxidization, reduction and dealkalization, and spherical ultrafine particles of carbon, activated carbon, silica, or a simple metal comprising nickel and a platinum-family metal are consequently obtained.

4. A method for the production of spherical ultrafine particles according to claim 2 or claim 3, wherein said organic substance is a thermosetting resin selected from the group consisting of phenol resin, furfural resin, melamine resin, urea resin, epoxy resin, alkyd resin, unsaturated polyester resins, silicone resin, xylene resin and urethane resin.

5. A method for the production of spherical ultrafine particles according to claim 2 or claim 3, wherein said inorganic substance is selected from the group consisting of water glass, clay and ceramic slurry.

6. A method for the production of spherical ultrafine particles according to claim 5, wherein said inorganic substance is said ceramic slurry, and said ceramic slurry comprises at least one substance selected from the group consisting of alumina, silica, cordierite, mullite, zirconia, chamotte, barium titanate and zeolite.

7. A method for the production of spherical ultrafine particles according to claim 5, wherein said inorganic substance is said ceramic slurry, and said ceramic slurry in an atomizer outlet has a viscosity falling in a range of 150~3000 cp.

8. A method for the production of spherical ultrafine particles according to claim 1, wherein an external power source is used to apply a voltage between said through holes, thereby atomizing the particles and the atomized particles that are spouted through said nozzle are electrically charged and consequently prevented from being mutually recombined.

9. A method for the production of ultrafine particles according to claim 8, wherein said electrically charged finely divided liquid particles are dropped into a reaction solution plus a surfactant capable of reacting with said solution and are consequently enabled to be transformed into any particulate shape.

10. A method for the production of ultrafine particles according to claim 1 or claim 8, wherein a nozzle part furnished with through holes is enveloped with an inert, reducing or oxidizing atmosphere, and said atmosphere is immediately controlled subsequent to fine division.

11. A method for the production of ultrafine particles according to claim 9, wherein the shape is selected from the group consisting of a scaly shape, an oval shape and a spherical shape.

12. A method for the production of ultrafine particles according to claim 1, wherein the ultrafine particles are electrochemical activated carbon.

13. A method for the production of ultrafine particles according to claim 1, wherein the ultrafine particles are printer-capable toners.

14. A method for the production of ultrafine particles according to claim 1, wherein the ultrafine particles are spherical porous silica particles.

15. A method for the production of ultrafine particles according to claim 1, wherein the ultrafine particles are spherical fine metal particles.

* * * * *